July 6, 1965     I. J. LUBALIN     3,192,579

METHOD OF AND A DEVICE FOR MANUFACTURING COMPOSITE MOLDS

Filed Jan. 22, 1963     4 Sheets-Sheet 1

| FIG. 10 | FIG. 9 |

INVENTOR.
IRWIN J. LUBALIN
BY *Hane and Nydick*

ATTORNEYS

INVENTOR.
IRWIN J. LUBALIN

July 6, 1965 I. J. LUBALIN 3,192,579
METHOD OF AND A DEVICE FOR MANUFACTURING COMPOSITE MOLDS
Filed Jan. 22, 1963 4 Sheets-Sheet 3

INVENTOR.
IRWIN J. LUBALIN
BY Hane and Hydick
ATTORNEYS

July 6, 1965     I. J. LUBALIN     3,192,579
METHOD OF AND A DEVICE FOR MANUFACTURING COMPOSITE MOLDS
Filed Jan. 22, 1963     4 Sheets-Sheet 4

INVENTOR.
IRWIN J. LUBALIN
BY *Haus and Nydick*

ATTORNEYS

United States Patent Office 3,192,579
Patented July 6, 1965

3,192,579
METHOD OF AND A DEVICE FOR MANU-
FACTURING COMPOSITE MOLDS
Irwin J. Lubalin, Rockville Center, N.Y., assignor to
British Industries Corp., Avnet-Shaw Division, Plain-
view, Long Island, N.Y., a corporation of New York
Filed Jan. 22, 1963, Ser. No. 253,226
16 Claims. (Cl. 22—20)

The present invention relates to a method of producing precision casting molds, particularly one-shot molds, in a coninuous operation, and also to a machine or assembly for making precision casting molds in continuous operation.

It is a broad object of the invention to provide a novel and improved method of the general kind above referred to in which the mold or mold part to be made is formed step by step in a plurality of processing stations.

A more specific object of the invention is to provide a novel and improved method of the general kind above referred to in which a succession of mold flasks or boxes for forming the molds or mold parts therein are cycled past a plurality of processing stations, and in which each mold or mold part is finished upon completion of a cycle.

Another more specific object of the invention is to provide a novel and improved method of the general kind above referred to in which first a preform mold is formed by means of a preform mold pattern, and then a final mold is formed by means of a final mold pattern.

Still another more specific object of the invention is to provide a novel and improved method of the general kind above referred to according to which a succession of mold flasks or boxes are cycled first past preform pattern stations for forming preform molds, then past final pattern stations and filling stations for forming the final molds, then past dwelling stations providing time for hardening of the mold slurry, and finally past stations for separating the flasks or boxes and the mold patterns from the final molds.

It is also a broad object of the invention to provide a novel and improved machine or assembly of the general kind above referred to in which there are provided in cooperating relationship stations for forming the preform molds, stations for forming the final molds, dwelling stations for the setting and hardening of the final molds, and stations for removing the final molds from the flasks and the mold patterns and readying the mold patterns for a new mold-forming cycle.

Another broad object of the invention is to provide a novel and improved pattern plate for use in a mold-making assembly of the general kind above referred to, which pattern plate has thereon a mold preform pattern and a final mold pattern, and which when cycled through an assembly according to the invention is automatically repositioned so that a mold is first formed in conformity with the preform pattern and then in conformity with the final pattern.

Other and further objects, features and advantages of the invention will be pointed out hereinafter and set forth in the appended claims constituting part of the application.

In the accompanying drawings several preferred embodiments of the invention are shown by way of illustration.

Figure 1:
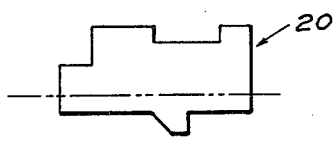
FIG. 1 shows the outline of an exemplification of an object to be cast.

Referring first to FIGS. 1-6 in detail, it should be understood that the profile of the object 20 to be cast as shown in FIG. 1 is selected merely for purpose of exemplification. An imaginary horizontal line represents the plane of the parting line of the casting mold now to be described.

Figure 2:
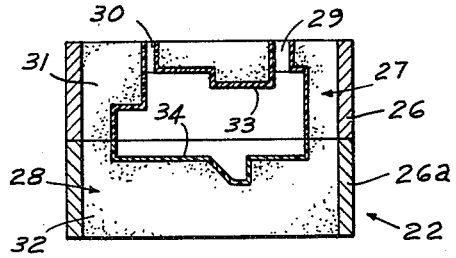
FIG. 2 is a sectional view of a composite mold for casting the object of FIG. 1.

The composite mold 22 of FIG. 2 is a two-part mold. There are shown boxes 26 and 26a held in registry, a cope 27, a drag 28, a pouring hole or sprue 29, and a gas vent 30. The mold material 31 and 32 defines the preform or backing of the mold, and facings or liners 33 and 34 define the final form of the mold. Any materials suitable for forming molds of the kind here in question may be used, such as sand and a ceramic liner. A slurry formed of sodium silicate bonded chamotte grog has been found particularly suitable for precision casting. The mold material as such does not constitute part of the invention.

Figure 3:
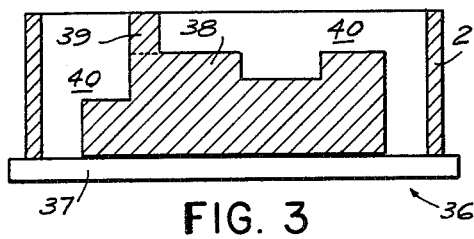
FIG. 3 is a sectional view of a flask and a pattern for making a preform of one part of the composite mold according to FIG. 2.
Figure 4:
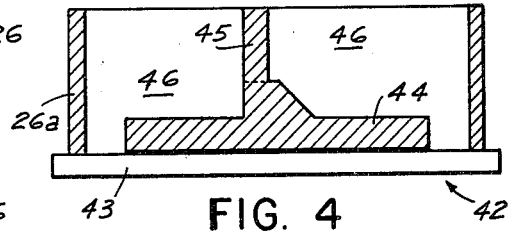
FIG. 4 is a sectional view of the flask, the preform pattern and the final pattern for making the final mold of that part.

Referring now to FIGS. 3 and 4, which illustrate the cope part of the mold, these figures show a pattern plate 36 which comprises a base plate 37 to which is secured a preform pattern 38. The configuration of the pattern defines the outline of the mold material 31 of FIG. 2; that is, pattern 38 defines a mold form which is slightly larger than the form of the final mold. Pattern 38 is formed with a burr or neck 39 which provides access for the slurry to be used for forming the final mold form. The free space 40 of FIG. 3 is now filled with the preform molding material indicated by 31 in FIG. 2. The preform mold or backing is now completed.

To produce a final mold, pattern plate 36 is withdrawn and replaced by a pattern plate 47 to which is secured the final mold pattern 48. As may be noted, insertion of final pattern 48 defines a space 49 between that pattern and the preform mold. This space is filled with additional slurry through a pouring hole or sprue 39a formed by neck 39. This additional slurry, which may consist of a fine refracting powder suspended in a silicate binder, forms the facing or liner 33.

The cope of the composite mold according to FIG. 2 is now completed.

Figure 6:
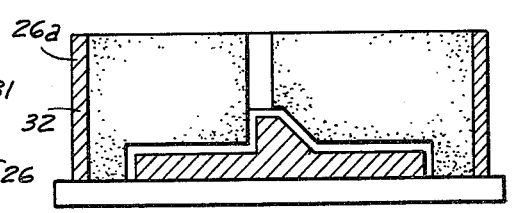
FIG. 6 is a sectional view of a flask, the preform mold and a pattern for making the final mold of said other part of the composite mold.

The drag of the composite mold is produced in the same manner. A pattern plate 42 comprising a base plate 43 and a preform pattern 44 secured to the base plate is inserted in box 26a. Space 46 is then filled with preform molding material, thus forming the preform of the drag. A neck 45 on pattern 44 again provides for access during the second mold-forming operation. The second operation is illustrated in FIG. 6, and is evident from the description of FIG. 4.

Figure 7:
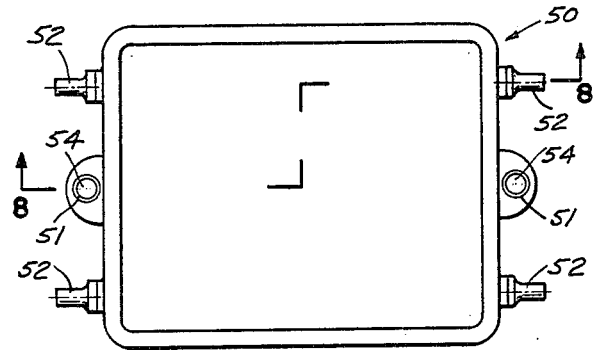
FIG. 7 is a plan view of a pattern plate having thereon the mold patterns shown in FIGS. 3, 4 or 5, 6 and of a flask placed upon the pattern plate.
Figure 11:
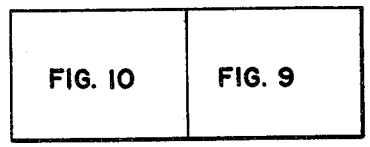
FIG. 11 is a chart locating FIGS. 9 and 10.
Figure 8:
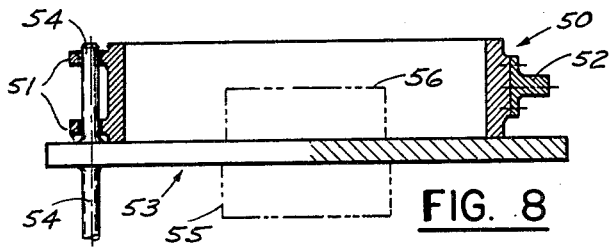
FIG. 8 is a section taken on line 8—8 of FIG. 7.

FIGS. 7 and 8 show a box assembly to be used in the automatic machine or installation illustrated in FIGS. 9–15. The assembly comprises a base plate 53 which has secured thereto on one side a diagrammatic indication of a preform mold pattern 55 and on the other side a digrammatic indication of a final mold pattern 56. The patterns are only diagrammatically indicated, as it is apparent from the previous description that the specific configurations of the patterns are determined by the object to be cast. The preform and the final pattern may have for instance the configurations described in connection with FIGS. 1 to 6. A box 50 is placed upon one or the other side of the pattern plate and is secured to the pattern plate and held in registry with the mold patterns thereon by any suitable means. There are shown eye lugs 51 on the box engageable with pins 54 on the pattern plate. The box is further provided with lugs 52 at each corner for lifting the box during each mold-forming cycle, as will be more fully described later.

The automatic machine or installation according to FIGS. 9–16 comprises basically a conveyor for guiding a succession of box assemblies, as shown in FIGS. 7 and 8 and described in connection therewith, along a predetermined path. While the box assemblies travel along said path, they pass a number of processing stations in which a sequence of operations are performed on the box assemblies, as a result of which a finished and final casting mold emerges at the end of the predetermined path.

Figure 9:
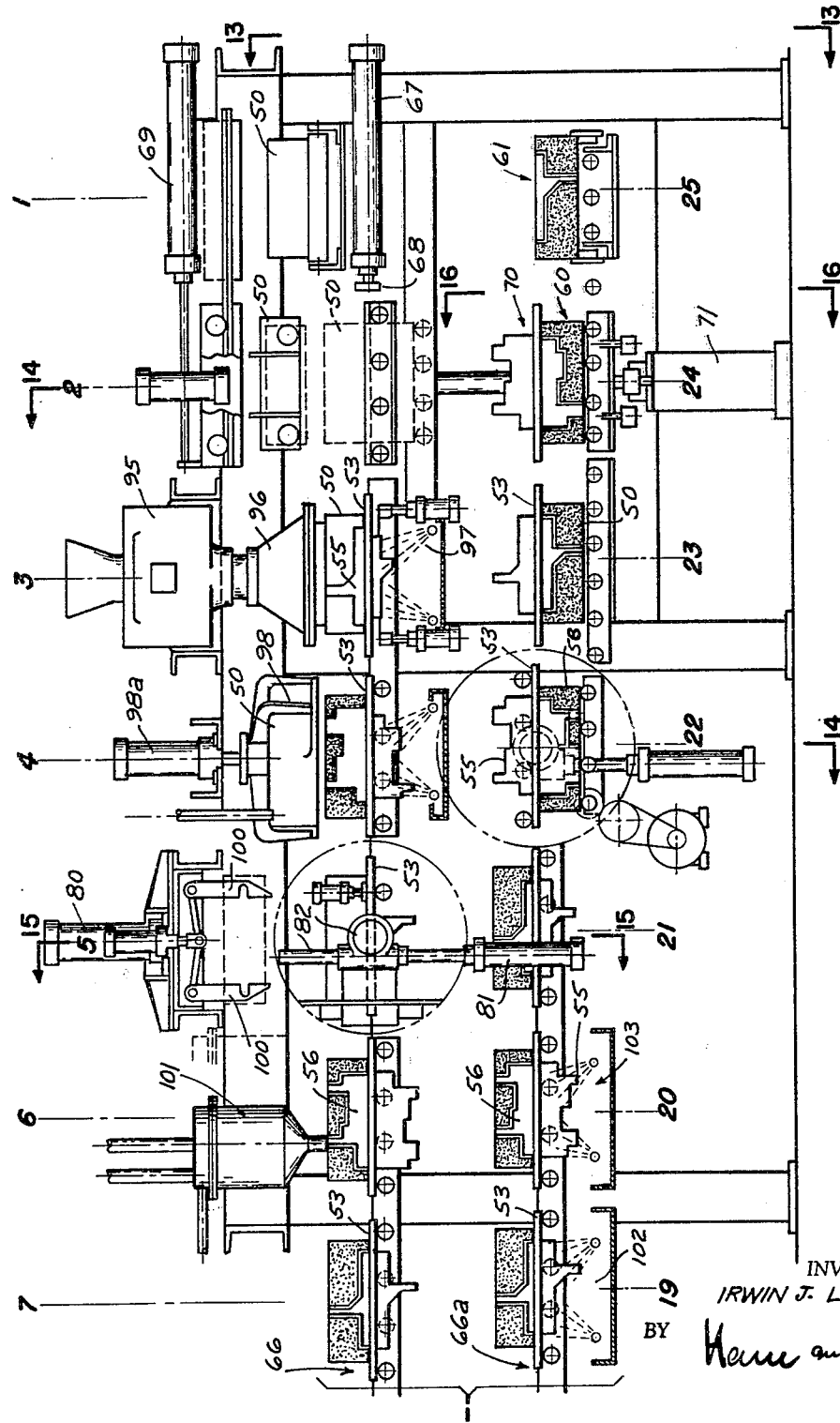
FIGS. 9 and 10 are diagrammatic views of a mold-making machine or assembly according to the invention.
Figures 10, 12:
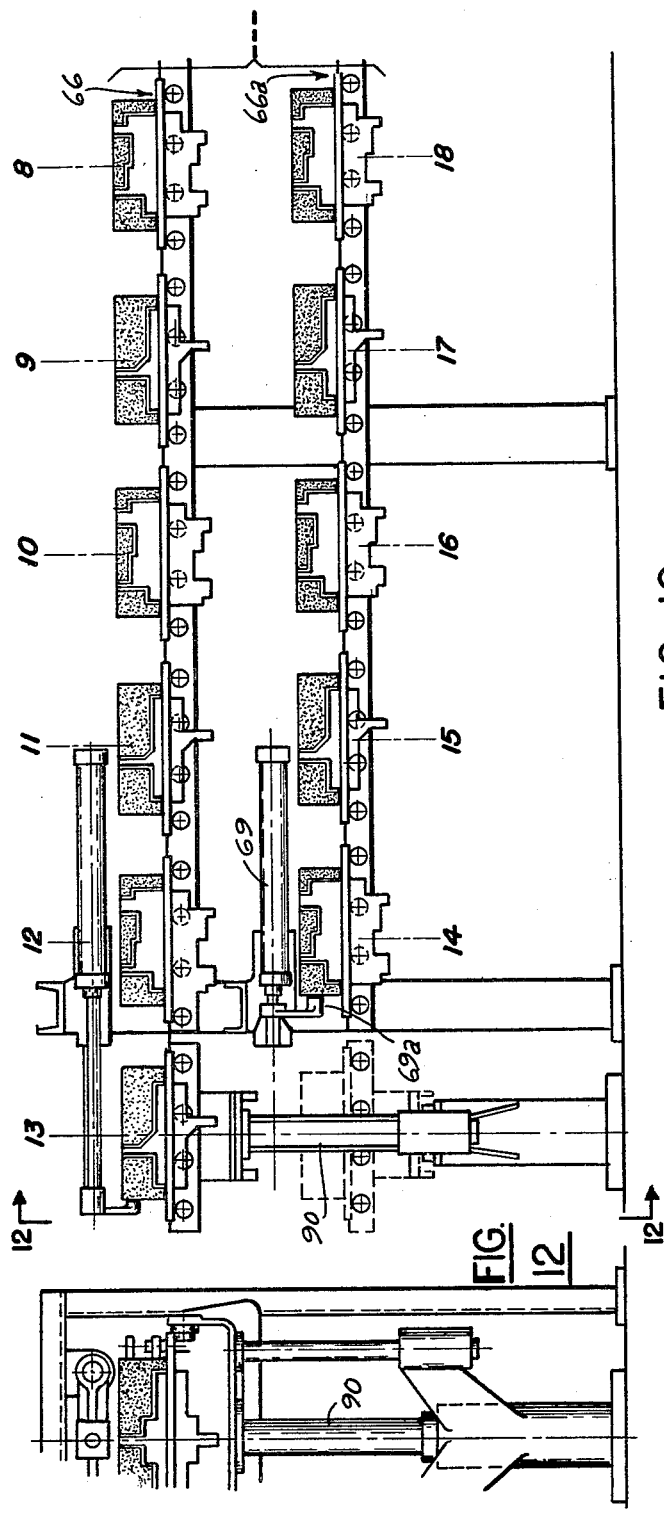
FIG. 12 is a side view of FIG. 10 taken in the directions of arrows 12—12.
Figure 13:
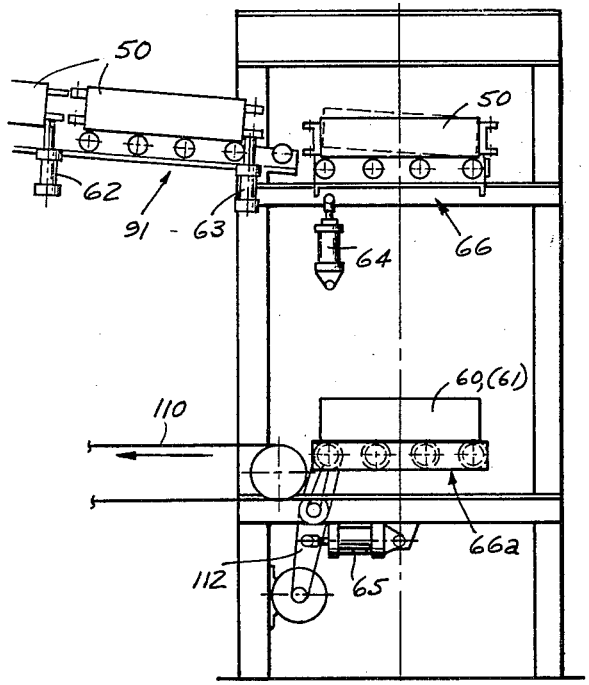
FIG. 13 is an end view of FIG. 9 taken in the direction of arrows 13—13.
Figure 14:
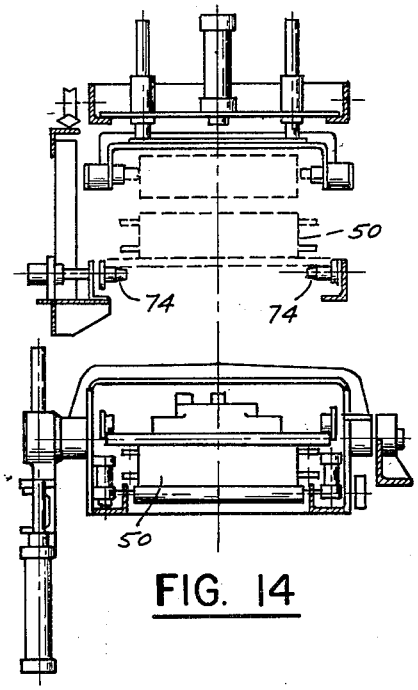
FIG. 14 is a section taken on line 14—14 of FIG. 9.
Figure 15:
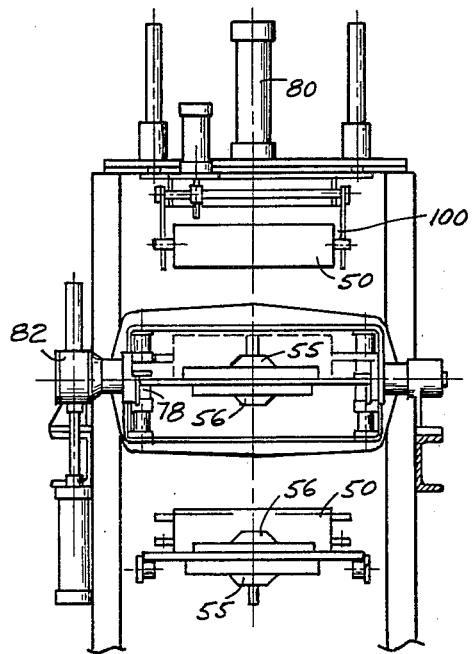
FIG. 15 is a section taken on line 15—15 of FIG. 9.
Figure 16:
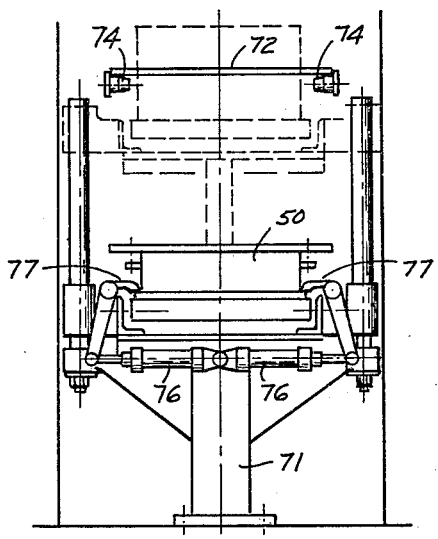
FIG. 16 is a section taken on line 16—16 of FIG. 9.

There are indicated in FIGS. 9 and 10 twenty-five stations. However, it should be understood that there may be more or fewer stations. The conveyor is shown as having an upper run 66 and a lower run 66a. The upper run includes stations marked 1–13, and the lower run stations marked 14–25. The entire conveyor could of course also be arranged in one level. The division into an upper and a lower run is made only for the purpose of space economy. Furthermore, the two runs could be of unequal length. Instead of straight runs, a curved run in the form of an endless or an open loop could be provided.

In the exemplified arrangement a plurality of pattern plates 53 (see FIG. 8) are successively placed upon the upper run 66, starting with station 2. The pattern plates when in station 2 are so placed that the preform 55 (see FIG. 8) faces upwardly. When the machine is fully loaded there is a pattern plate in each of the stations 2–24. All the pattern plates are of equal length and are in movement-transmitting coupling with each other. For instance, each two adjacent pattern plates may abut each other, as is indicated in FIGS. 9 and 10 by lines between each two pattern plates. The pattern plates are moved from station 2 to staton 13 by suitable drive means, shown as an air cylinder 67 and piston 68, which piston pushes against the pattern plate in station 2, thereby moving all the pattern plates in upper run 66. Each pattern plate, when reaching station 13, is lowered to the level of run 66a by means of a vertically disposed air cylinder 90. After lowering a pattern plate, the air cylinder returns to its upper level position.

Each pattern plate as it is deposited on the lower run is gripped by a claw 69a of an air cylinder 69 and pushed toward station 25, thereby moving all the pattern places on the lower run step by step toward that station.

Flasks or boxes 50 are supplied to the machine in station 1. For this purpose a further conveyor 91 is provided which terminates adjacent the receiving end of the upper run 66 in station 1, as can best be seen in FIG. 13. Boxes 50 are delivered to upper run 66 from a shake-out room in which they are cleaned and otherwise readied for use. Conveyor 91 may be power or gravity operated. The travel of the boxes on conveyor 91 is controlled by air cylinders 62, 63 and 64 so that the boxes are delivered one at a time.

As was explained in connection with FIGS. 2–6, the mold to be produced is a composite mold and requires the production of two mold parts, as shown in FIGS. 3, 4 and 5, 6. Accordingly, two sets of pattern plates, each having on one side a preform pattern and on the other side a final mold pattern of the respective mold part are alternately supplied to the conveyor 66, 66a of the machines, as is clearly shown in FIGS. 9 and 10.

Each box delivered to station 1 by conveyor 91 is moved by an air cylinder 69 into station 2 and is lowered over the preform 55 on the base plate 53 in that station and clamped to the base plate, as described in connection with FIGS. 7 and 8.

It should be mentioned in this connection that when the machine is fully loaded, the base plate in station 2 is supplied from station 24 just below station 2, as will be more fully described hereinafter. The box assembly is now ready to be filled with slurry to form the preform mold, and it is moved for that purpose into station 3. This station is equipped with a suitable mold-filling apparatus. It has been found that a mold-filling apparatus particularly suitable for the purpose is an apparatus known under the trademark "Hansberg Shooter," and such apparatus is diagrammatically indicated in station 3. This apparatus comprises a housing 95 and a hood 96 which fits over the rim of box 50. Housing 95 includes a chamber accommodating a supply of refractory back up slurry, such as a mixture of chamotte grog and sodium silicate, and means for applying sudden strong air pressure above the slurry. Thus the supply of slurry is rapidly transported or "shot" from the chamber into the flask. As a result of the movement of the slurry, the same is tightly packed into the box, closely conforming to the configuration thereof. Mold-filling machines of the kind above referred to are more fully described, for instance, in Patents 2,793,409 and 3,038,221.

As has been explained in connection with FIGS. 7 and 8, the final mold pattern is also secured to plate 53 and depends from the bottom of the plate. During the filling operation the exposed final pattern is cleaned of debris by blowing air jets 97 upon the face of the pattern. The loosened debris may be collected in a chute for reclamation.

Upon completion of the filling operation, the box assembly, now filled with slurry, moves on to station 4. In this station a metal bell jar 98 is lowered over the box by means of air cylinder 98a and is tightly sealed thereto by any suitable means, such as a rubber gasket. The tank thus formed is evacuated, and a hardening agent such as $CO_2$ gas is fed into the mold. Such an arrangement as part of a mold-filling operation is more fully described in Patent 3,038,221.

As the gassing of the mold occurs, a parting agent fog is supplied by jets 99 upon the exposed final mold pattern depending from base plate 53. Upon completion of the gassing and spraying operations, the vacuum seal is broken. As a result of gassing with $CO_2$ the slurry forming the preform is comparatively rapidly hardened and ready to serve as backing for a liner forming the final form. The box assembly is now moved into station 5 in which box 50 with the preform mold or backing therein is stripped from the pattern plate by engaging the four lugs 52 of the box by means of overhead toggle arms 100. These toggle arms, and with them the box and the preform mold therein, are lifted by an air cylinder 80. The pattern plate, now clear of the box, is rolled over through an angle of 180 degrees by any means suitable for the purpose such as a double roller system operated by means of a pinion and rack 82 and an air cylinder 81 so that the final mold pattern 56 now faces upwardly. Means suitable for turning the pattern plate are readily apparent and are only diagrammatically indicated. The box is then lowered again in position over the final mold pattern by means of cylinder 80, using pins 54 on the base plate as alignment pins. The box is released from arms 100 when it rests again upon the pattern plate.

The box assembly is now moved into station 6.

Figure 5:
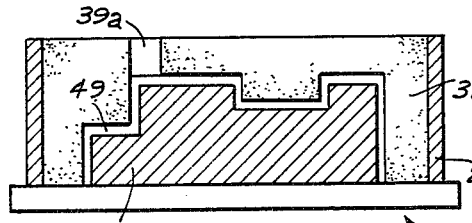
FIG. 5 is a sectional view of a flask and a pattern for making a preform of the other part of the composite mold of FIG. 2.

As has been described in connection with FIGS. 5 and 6, the final mold pattern is slightly smaller than the preform mold pattern so that space is left between the preform in the box and the final mold pattern. In station 6 this space is filled by another mold-filling machine of suitable design, indicated at 101. The slurry filled into the space between the preform mold and the final pattern serves to produce accurately the desired configuration of the mold and forms a facing or liner backed by the slurry hardened by gassing with $CO_2$ as previously described. The slurry delivered by filling machine 101 to the box may consist of a dispersion of a fine refracting material in a suitable gellable binder.

Upon completion of the second filling operation in station 6, the final mold now contained in the box is passed step by step through dwell stations 7–18, in which no operations are performed upon the mold. It may only be mentioned that when the box assembly with the final mold therein passes from station 13 to station 14, it is lowered from the upper run 66 of the conveyor to the lower run 66a. The number of dwell stations is of course not a fixed one. It has to be selected in accordance with the particular type of slurry used for forming the liner or facing, specifically the gelling and hardening time of such slurry, and should also be correlated with the rate of movement of the box assembly along the conveyor path. In other words, the aforementioned dwell stations signify merely the provision of an adequate time for gelling and hardening the slurry before the next operation is performed on the box assembly. As is evident, the required dwelling time can also be provided by temporarily removing the boxes filled with the liner slurry from the conveyor.

In any event, if a slurry material of the kind previously referred to is used, the slurry should be hardened to a medium consistency or rubberlike condition when the mold assembly reaches station 18. In station 19 the mold hardens further. The preform pattern, which now hangs down vertically, is cleaned by air sprays 102. As mentioned before, any debris removed may be collected for reclamation.

In station 20 the cleaned preform pattern is sprayed with a parting agent fog, as is indicated at 103. The mold hardens further, and in station 21 it will be of a hard rubberlike consistency.

In station 22, the entire box assembly is again rolled over through 180 degrees by any means suitable for the purpose, such as a double roller system. The box with the final mold therein now hangs downwardly from base plate 53, and the preform mold pattern 55 again faces upwardly. As was described in connection with stations 19 and 20, the preform pattern has been cleaned and sprayed with a parting agent.

Station 23 is again a dwell station. The mold should now have reached its final, very hard rubberlike consistency.

In station 24 the pattern plate is stripped from the mold. For this purpose the entire box assembly therein is lifted to the level of upper run 66 by means of an air cylinder 71. The pattern plate is retained in its lifted position by air-operated pins 74. When the air cylinder 71 retracts, the box with the mold therein is stripped from the pattern plate and lowered back to its original position. Air cylinder 76, by means of hooks 77, engages the box for the stripping operation.

The pattern plate, which has now completed its cycle within the machine, is now ready to be covered again with a box 50 to begin a new cycle. The finished and final molds 60 and 61 respectively move into station 25 and are then removed, together with the box in which they were formed, from the lower run 66a by being pushed upon a removal conveyor 110 by any suitable means, such as an air cylinder 65 coacting with a two-arm lever 112.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A method of producing molds for precision casting in continuous operation, said method comprising the steps of: providing a set of pattern plates each having on one side a preform mold pattern and on the other side a final mold pattern, moving said pattern plates successively along a predetermined path and sequentially, placing flasks over the preform pattern on successive plates moving with the preform pattern facing up; filling the flasks with a hardening slurry to form a preform mold; stripping the flasks with a preform mold therein from the pattern plates; reversing the pattern plates so that the final pattern thereon faces up; placing the flasks with the preform mold therein over the final mold pattern; filling the space between the preform mold and final mold patterns with additional hardening slurry to form the final mold; providing a period of time to allow for setting and hardening of the slurry, reversing the pattern plates so that the preform pattern thereon again faces up, stripping the pattern plates and the flasks from the final molds, and removing the final molds.

2. A method of producing composite molds for precision casting in continuous operation, said method comprising the steps of providing two sets of pattern plates, each having thereon on one side a preform mold pattern and on the other side a final mold pattern, the patterns on the plates of one set defining one part of the composite molds and the patterns on the plates of the other set defining another part of the molds, moving pattern plates of alternate sets successively along a predetermined path and sequentially, placing flasks over the preform pattern on successive plates moving with the preform pattern facing up, filling the flasks with a hardening slurry to form a preform mold, stripping the flasks with a preform mold therein from the pattern plates, reversing the pattern plates so that the final pattern thereon faces up, placing the flasks with the preform mold therein over the final mold pattern, filling the space between the preform mold and final mold pattern with additional hardening slurry to form the final mold, providing for travel of the filled flasks along said path for a period of time sufficient to allow for setting and hardening of the slurry, reversing the pattern plates so that the preform pattern thereon again faces up, stripping the pattern plates and the flasks from the final molds, and removing the final molds from said predetermined path.

3. A method of producing molds for precision casting in continuous operation, said method comprising the steps of providing a pattern plate having on one side a preform mold pattern and on the other side a final mold pattern, placing a flask over the preform pattern on the plate, filling the flask with a hardening slurry to form a preform mold, stripping the flask with the preform mold therein from the pattern plate, reversing the pattern plate so that the final pattern thereon faces up, placing the flask with the preformed mold therein over the final mold pattern, and filling the space between the preform mold and final mold pattern with additional hardening slurry to form the final mold.

4. An assembly for producing molds for precision casting in continuous operation, said assembly comprising a plurality of flasks, a plurality of pattern plates each having on one side a preform mold pattern and on the other side a final form mold pattern, conveyor means for moving successive pattern plates along a predetermined path, and in the direction of movement of said pattern plate a station including means for placing a flask over the preform pattern of successive pattern plates, a station including means for filling flasks of successive pattern plates with a hardening slurry to form a preform mold, a station including means for stripping the flask and the preform mold therein from successive pattern plates, means for reversing each pattern plate so that the final pattern thereon now faces the respective flask and the mold therein and means for placing the flask and the preform mold therein over the final pattern, a station including means for filling the flask on successive pattern plates with additional hardening slurry to form the final mold, and a station including means for stripping the flask and the pattern plate from successive final molds.

5. An assembly according to claim 4 wherein the distance of travel between said station for filling the flasks with additional slurry and said station for stripping the flasks and the pattern plates from the final molds and the rate of movement of the pattern plates along said distance are correlated to provide a dwell time corresponding to the required hardening time of the slurry.

6. An assembly according to claim 4 wherein said conveyor means comprise two superimposed horizontal runs and power drive means at one end of each run, said pattern plates being disposed on said runs in movement-transmitting relationship, and each of said drive means being engageable with the pattern plate next adjacent to said one end of the respective run for pushing the pattern plates towards the other end of said run, and transfer means for transferring pattern plates from said other end of the upper run to said one end of the lower run.

7. An assembly according to claim 6, wherein a second conveyor means supplies flasks to said one end of the upper run for fitting said flasks over the preform pattern on the pattern plates in said first station.

8. An assembly according to claim 4 wherein means for applying a parting agent to the mold pattern opposite to that within the respective flask are provided in some of said stations.

9. An assembly for producing molds for precision casting in continuous operation, said assembly comprising a plurality of flasks, a plurality of pattern plates each having on one side a preform mold pattern and on the other side a final form mold pattern, conveyor means for moving successive pattern plates along a predetermined path, and in the direction of movement of said pattern plates a station including means for placing a flask over the preform pattern of successive pattern plates, a station including means for filling the flasks of successive pattern plates with a hardening slurry to form a preform mold, a station including means for stripping the flask and the preform mold therein from successive pattern plates, means for reversing each pattern plate so that the final pattern thereon now faces the respective flask and the mold therein and means for placing the flask and the preform mold therein over the final pattern, a station including means for filling the flask on successive pattern plates with additional hardening slurry to form the final mold, a station including means for again reversing successive pattern plates with the flask and the final mold therein into the position occupied by the pattern plates in said first station, and a station including means for stripping the flask and the pattern plates from successive final molds and for returning the pattern plates to the first mentioned station and removing the final molds from said predetermined path.

10. An assembly for producing a mold for precision casting, said assembly comprising a flask, a pattern plate having on one side a preform mold pattern and on the other side a final form mold pattern, means for moving the pattern plate along a predetermined path and in the direction of said path, a means for placing the flask over the preform pattern of the pattern plate, means along the path for filling the flask of the pattern plate with a hardening slurry to form a preform mold, means for stripping the flask and the preform mold therein from the pattern plate, means for reversing the pattern plate so that the final pattern thereon now faces the flask and the mold therein, means for placing the flask and the preform mold therein over the final pattern, means for filling the flask on the pattern plate with hardening slurry to form the final mold, and means for stripping the flask and the pattern plate from the final mold.

11. An assembly according to claim 10 wherein the pattern plate comprises a base plate, a preform pattern secured to one side of said base plate, and a final form pattern secured to the other side of said base plate, the preform pattern characterized by being of identical shape, but of greater size than the final mold pattern, and of reverse configuration from the one end to the other end on the base plate than the final form pattern.

12. An assembly according to claim 10 which includes additionally means for cleaning the mold pattern opposite to that within the respective flask.

13. An assembly according to claim 10 which includes additionally means for applying a parting agent to the mold pattern opposite to that within the respective flask.

14. A method of producing molds for precision casting in a continuous operation employing a set of pattern plates each having on the one side a preform mold pattern and on the other side a final mold pattern, which method comprises the steps of:

moving said pattern plates successively along a predetermined path and sequentially:

placing the flasks over the preform pattern on successive plates moving with the preform pattern facing up;

filling the flasks with a hardening slurry to form a preform mold;

stripping the flasks with a preform mold therein from the pattern plates;

cleaning the final mold pattern on the opposite side of the pattern plate while the preform mold pattern is engaged in any of the preceding steps of placing, filling and stripping;

reversing the pattern plates so that the clean final pattern thereon faces up, and the unclean preform mold pattern faces down;

placing the flasks with the preform mold therein over the final mold pattern;

filling the space between the preform mold and final mold pattern with additional hardening slurry to form the final mold;

providing a period of time to allow for setting and hardening of the slurry;

cleaning the preform mold pattern on the opposite side of the pattern plate while the final mold pattern is engaged in any of the preceding steps of placing, filling and providing;

reversing the pattern plates so that the clean preform pattern thereon again faces up and the unclean final mold pattern faces down;

stripping the pattern plates and the flasks from the final molds; and removing the final molds.

15. A method as defined by claim 14 which includes applying a mold parting agtnt to the downwardly disposed preform and final mold pattern after the cleaning step.

16. A method as defined by claim 14 wherein the final mold pattern is cleaned during the filling step and the preform mold pattern is cleaned during the period of time allowed for setting and hardening the slurry.

References Cited by the Examiner

UNITED STATES PATENTS

| | | | |
|---|---|---|---|
| 1,317,710 | 10/19 | Koch | 22—32 |
| 2,515,017 | 7/50 | Nicholson | 18—47 |
| 2,592,340 | 4/52 | Ronceray | 22—157 |
| 2,782,471 | 2/57 | Mathisen | 22—20 |
| 2,892,226 | 6/59 | Bradney | 22—157 |
| 2,931,081 | 4/60 | Dunlap | 22—193 |
| 3,010,166 | 11/61 | Skoning | 22—193 |
| 3,077,014 | 2/63 | Jennings | 22—20 |

FOREIGN PATENTS

| | | |
|---|---|---|
| 612,897 | 1/61 | Canada. |
| 299,439 | 8/54 | Switzerland. |

MARCUS U. LYONS, *Primary Examiner.*

ROBERT F. WHITE, *Examiner.*